Oct. 30, 1951      C. H. ABBOTT      2,573,173
MACHINE FOR SUCCESSIVELY CLEANING BOTH SIDES OF
CENTRIFUGAL SEPARATOR DISKS
Filed April 14, 1947      2 SHEETS—SHEET 1
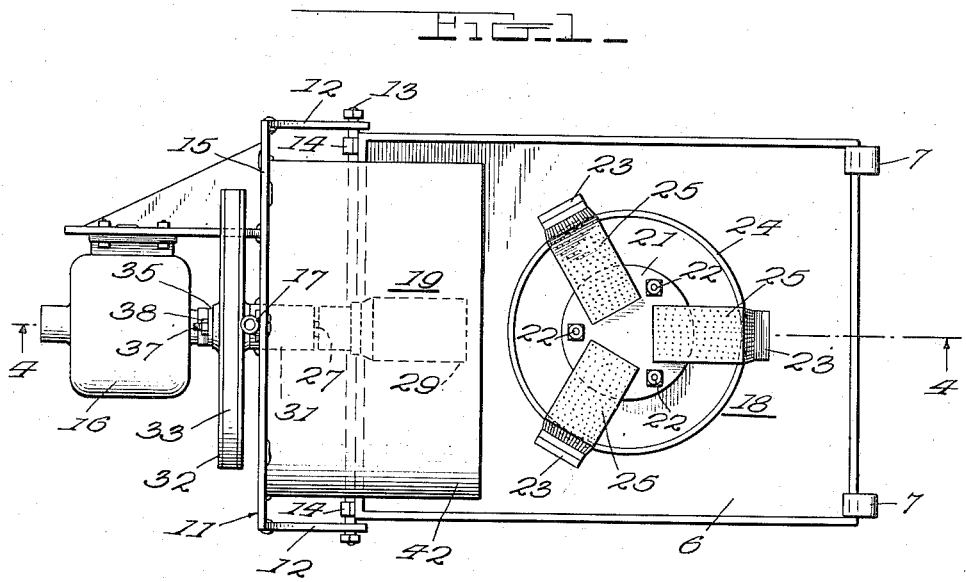
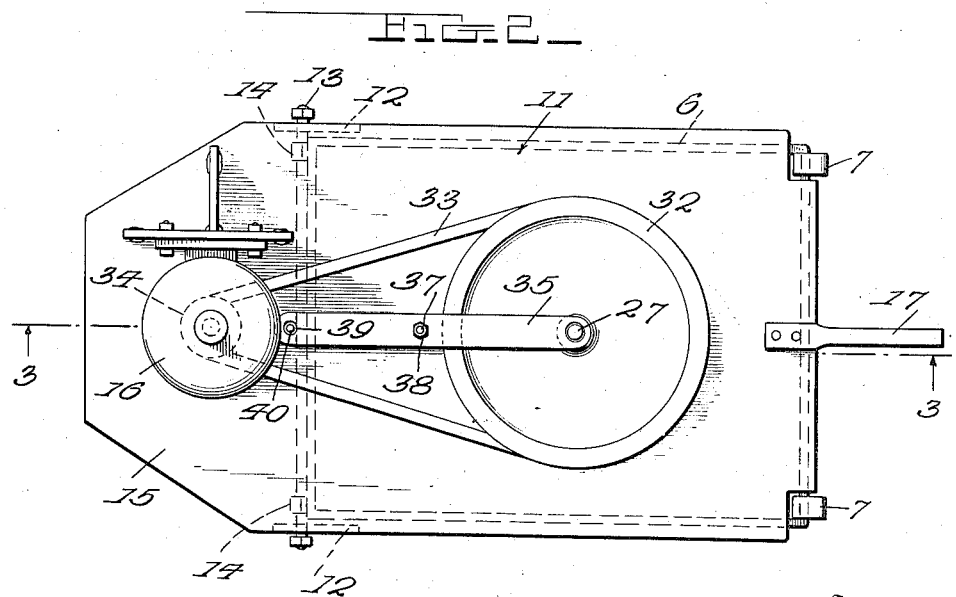
Inventor
Claude H. Abbott
By
H.B.Wilsson &Co.
Attorney Oct. 30, 1951     C. H. ABBOTT     2,573,173
MACHINE FOR SUCCESSIVELY CLEANING BOTH SIDES OF
CENTRIFUGAL SEPARATOR DISKS
Filed April 14, 1947     2 SHEETS—SHEET 2
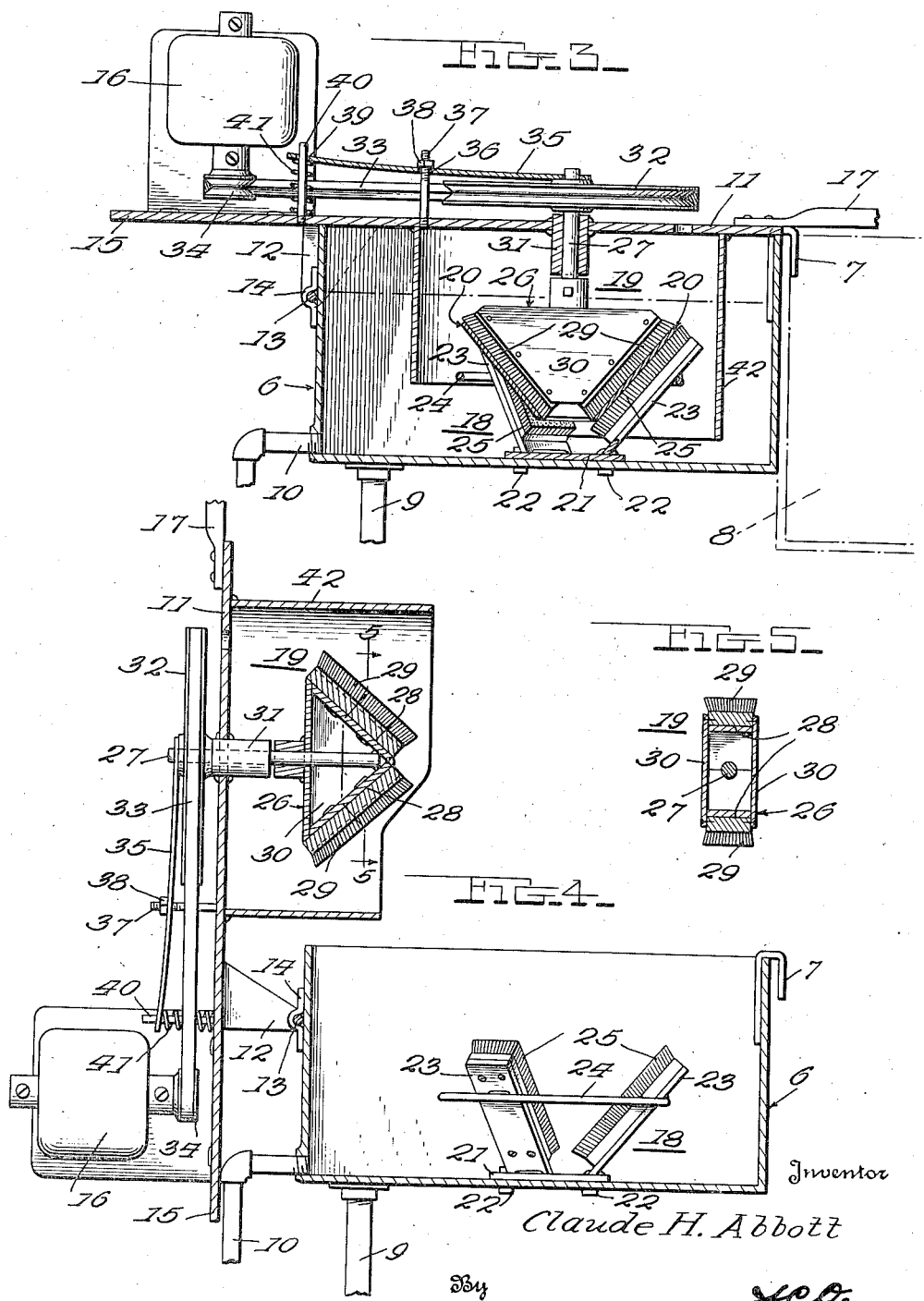
Inventor
Claude H. Abbott
By H. B. Wilson & Co.
Attorney

UNITED STATES PATENT OFFICE 2,573,173

MACHINE FOR SUCCESSIVELY CLEANING BOTH SIDES OF CENTRIFUGAL SEPARATOR DISKS

Claude H. Abbott, Astoria, Oreg.

Application April 14, 1947, Serial No. 741,228

7 Claims. (Cl. 15—21)

The invention has aimed to provide a new and improved machine for rapidly and thoroughly washing the disks of cream separators, primarily those of large separators, customarily used in creameries and dairies.

Upper and lower brushing means are provided to contact with the opposite sides of a conventional conical separator disk within a tank containing a washing liquid, and novel provision is made whereby it is only necessary to drive the upper brushing means to effect thorough brushing and washing of both sides of the disk.

Another object is to provide a novel construction in which a hinged cover for the tank constitutes part of the mounting means for the rotary brushing means and also carries a driving motor for said brushing means, the motor being preferably so located as to cause its weight to open the cover after each washing operation, thereby so reducing the attendant's duties that it is only required that he insert a disk, close the cover a few seconds, allow said cover to open, and remove the washed disk, these operations being of course repeated for each disk to be washed. The 125 disks used in a conventional large separator have been thoroughly washed in as little time as 15 minutes, against 1 hour for more arduous and less thorough hand washing.

Figure 1 of the accompanying drawings is a top plan view, the cover of the tank being opened.

Fig. 2 is a top plan view showing the cover closed.

Fig. 3 is a vertical longitudinal sectional view, partly in elevation, on line 3—3 of Fig. 2.

Fig. 4 is a similar view on line 4—4 of Fig. 1.

Fig. 5 is a detail section on line 5—5 of Fig. 4.

A preferred construction has been illustrated and will be rather specifically described, with the understanding, however, that within the scope of the invention as claimed, variations may be made.

A tank 6 is provided to contain a washing liquid, preferably hot water mixed with a suitable quantity of washing powder or the like. This tank may be supported in any suitable way but I have shown it provided with hooks 7 on one end to hook over the side wall of a common sink 8, such as those customarily used in dairies and creameries. Toward its other end, the tank may well be provided with a supporting leg 9 and with a drain pipe 10 which may be controlled by a suitable valve (not shown).

A hingedly mounted, upwardly swingable cover 11 is provided for the open top of the tank 6. In the present disclosure, this cover is provided with two downwardly projecting arms 12 through which a pivot rod 13 extends, said rod being connected with the end of the tank remote from the hooks 7, in any suitable way, as indicated at 14. The cover 11, the major portion of which projects in one direction with respect to the hinge axis, is provided with a minor portion 15 projecting in the opposite direction. This portion 15 carries an electric motor 16 for driving the rotatable brush means hereinafter described, and the weight of said motor acts to open said cover when permitted to do so. The opposite end of this cover is provided with a suitable handle 17 for closing said cover and holding it closed during each washing operation. As soon as pressure on this handle is released, the weight of the motor 16 opens the cover again as seen in Figs. 1 and 4.

A stationary brushing means 18 is fixedly mounted upon the bottom of the tank 6, and a rotary brushing means 19 is mounted on the cover 11 and is driven by the motor 16, to co-operate with said stationary brushing means 19 in effectively washing a conventional conical separator disk 20. The two brushing means 18 and 19 are so related that their axes are alined during the disk washing operation, and said means are provided with brushing surfaces uniformly inclined with respect to their axes, to simultaneously contact with the opposite conical surfaces of the disk 20 so that such surfaces will be successively scrubbed in a single operation of the machine as hereinafter explained.

In the present disclosure, the stationary brushing means 18 comprises a flat plate 21 bolted at 22 to the tank bottom, upwardly diverging plates 23 welded or otherwise secured to said plate 21 and spaced about a common center, a ring 24 surrounding and suitably secured to the plates 23, and suitable brushes 25, preferably fibre or bristle, having their backs secured to said plates 23. When the cover 11 is in open position, a separator disk 20 may be easily placed upon the brushes 25 in readiness for washing.

The rotary brushing means 19 in the present disclosure, comprises a triangular head 26 suitably secured to a shaft 27 and having in two of its downwardly and inwardly converging edges channels 28 in which the backs of two brushes 29 are secured, said head having flat parallel side plates 30 which, when the brushing means 19 is rotated in the washing liquid, rapidly whirl this liquid. The brushes 29, like the brushes 25, are preferably of fibre or bristle form, but it is of course possible to use brushes of other kinds, or even mere swabs, for which reason, such terms as "brushes" and "brushing means," as used herein, are to be considered as illustrative rather than limiting. It will be seen that the flat triangular head forms a liquid impelling blade disposed diametrically of the shaft between the two brushes 29, and that the rapid rotation of the head will cause the liquid to be violently whirled within and above the disk positioned between the brushes 25 and 29.

The shaft 27 is mounted for rotation and for slight endwise sliding, in an appropriate bearing 31 suitably secured to the cover 11. In the present showing, the outer end of this shaft is provided with a large pulley 32 connected by a belt 33 with the small drive pulley 34 of the motor 16, the pulleys being preferably of such relative sizes that the rotary brushing means 19 will be driven at about the speed of 250 R. P. M.

Some adequate provision is made for permitting slight upward yielding of the shaft 27 when the brushes 29 come into contact with the separator disk 20. In the present disclosure, a flat spring 35 is apertured to receive the outer end of the shaft 27 and rests against the hub of the pulley 32. Between its ends, the spring 35 is formed with an opening 36 through which a stud 37 extends, said screw-threaded stud being secured to the cover 11 and having a nut 38 resting upon said spring 35. In the end of the spring 35 remote from the shaft 27, another opening 39 is formed, through which a stud 40 extends, said stud being suitably secured to the cover 11. Surrounding this stud is a coiled compression spring 41 which rests on the cover 11 and acts upwardly against the spring 35. This so-called spring 35 is really more of a lever than a spring, and as the spring 41 exerts upward pressure on the outer end of this lever, its inner end pushes the shaft 27 yieldably down and permits some upward yielding of said shaft.

When the weight of the motor 16 acts to normally open the cover 11, as herein disclosed, the machine will stand as seen in Figs. 1 and 4 when unattended, unless said cover be held closed in some suitable way. When the machine is to be used, a proper quantity of hot water and washing powder or the like, are placed in the tank 6. The normal liquid level in the tank is shown by the dot and dash line in Fig. 3, and it will be noted that the stationary brushes are completely submerged in the liquid. The first disk 20 to be washed, is then placed by hand upon the brushes 25, and with the motor 16 operating, the cover 11 is closed. Upon the initial contact of the brushes 29 with the disk 20, the inertia of this disk and its friction with the stationary brushes 25 temporarily hold said disk against rotation and the brushes 29 therefore wash the inner side of the disk. Due to the fact, however, that the flat and diametrically disposed head or blade 26 rapidly whirls the water, this whirling very soon results in rotation of the disk 20 upon the stationary brushes 25, thereby washing the outer side of the disk. Thus, in quick succession, simply upon closing the cover 11, the inside of a disk and the outside of said disk are thoroughly washed. When the cover is permitted to open, the washed disk is taken out and may well be placed in the sink 8 for rinsing. Due to the fact that the lower brushes are stationary, the operator may safely insert and remove the disk without danger to his hand. The second disk is then inserted and its washing operation conducted in the same manner as the first disk. In actual practice, I have been able to wash the 125 disks of a conventional large cream separator, in as little time as 15 minutes, this being a great saving both in time and energy over hand washing which usually requires about one hour.

I am not certain why the disk 20 rotates, but successful use of the machine proves that it does. It may be that the whirling motion of the water caused by the upper brushing means 19 throws all water out of the disk 20, and then the buoyant effect of the water below the disk presses this disk upwardly against the brushes 29 hard enough to cause the disk to rotate with said brushes 29; or it may be that rotation of the upper brushing means 19 draws water into the lower end of the disk and discharges it over the top of said disk, producing a partial vacuum inside the disk and sucking it up against the upper brushes 29 with sufficient force to cause it to rotate with said brushes 29; or it may be that the mere friction of the whirling water against the disk causes it to rotate. Regardless of which theory may be correct, the violent whirling of the water does result in rotation of the disk 20, after the first few revolutions of the upper brushing means 19 upon said disk. I may therefore dispense with the usual driving means for the lower brushes, and thus produce a more simple and less expensive washer.

To prevent the centrifugally thrown water from splashing the attendant, and equipment, walls, ceiling, floor, etc., when the cover 11 is raised, I provide this cover with a cylindrical guard 42 surrounding the rotary brushing means 19. Since this guard wall 42 depends from the cover and completely surrounds the continuously rotating brushes 29, there is no likelihood of the liquid being thrown outside of the tank and upon the operator when the cover is raised.

From the foregoing, taken in connection with the accompanying drawings, it will be seen that novel and advantageous provision has been made for carrying out the objects of the invention, and while preferences have been disclosed, attention is again invited to the possibility of making variations within the scope of the invention as claimed.

I claim:
1. In a machine for cleaning the conical disks of centrifugal separator bowls, the combination of a tank to hold a washing liquid, stationary brushing means upon which a conical separator disk to be cleaned may be supported in an inverted position with its inner side uppermost, said stationary brushing means being mounted non-rotatably in said tank beneath the normal level of liquid therein, a rotary brushing means to engage the inner side of a separator disk supported by said stationary brushing means, means mounting said rotary brushing means for upward displacement with respect to said stationary brushing means and for axially aligning said two brushing means for operation, said two brushing means having brushing surfaces uniformly inclined to their axis to simultaneously contact with the opposite inclined surfaces of a separator disk when said rotary brushing means is lowered, means for driving said rotary brushing means, and a liquid impelling blade associated with said rotary brushing means and rotatable therewith for whirling the liquid within and above a separator disk disposed between the two brushing means; whereby upon initial lowering of said rotary brushing means upon a separator disk supported by said stationary brushing means, the inertia of the disk and its friction against said stationary brushing means will temporarily hold the disk against rotation and said rotary brushing means will therefore rotate upon and scrub the inner side of the disk, and whereby whirling of the liquid by means of said impelling blade will then result in rotation of the disk upon said stationary brushing means, thereby scrubbing the outer side of the disk.

2. The combination of claim 1 in which said means for mounting said rotary brushing means includes a cover for said tank movable to an open position to effect said upward displacement of said rotary brushing means and a shaft extending through and rotatably mounted in said cover, said shaft carrying on its lower portion said brushing surfaces and blade, together with a substantially cylindrical guard depending from and carried by the underside of said cover and surrounding the lower portion of said shaft to intercept liquid centrifugally thrown from said brushing surfaces and blade as the cover is opened.

3. The combination of claim 2 in which said rotary shaft is mounted for limited sliding movement through said cover and is spring-pressed in a downward direction through said cover.

4. In a machine for cleaning the conical disks of centrifugal separator bowls, the combination of a tank to hold a washing liquid, stationary brushing means upon which a conical separator disk to be cleaned may be supported in an inverted position with its inner side uppermost, said stationary brushing means being mounted non-rotatably in said tank beneath the normal level of the liquid therein and including an annular series of spaced and inclined rubbing elements arranged to contact with the outer side of a conical disk to be cleaned, rotary brushing means to engage the inner side of a separator disk supported by said rubbing elements and including a plurality of inclined rubbing elements spaced circumferentially around the axis of rotation of said rotary brushing means, the latter also including a triangular liquid impelling blade arranged between said last mentioned elements and diametrically of the axis of rotation of said rotary brushing means, means mounting said rotary brushing means for upward displacement with respect to said stationary brushing means and for axially aligning said two brushing means for operation, and means for driving said rotary brushing means to cause said blade to whirl the liquid within and above a separator disk positioned between the rubbing elements of the two brushing means; whereby upon initial lowering of said rotary brushing means upon a separator disk supported by said stationary brushing means, the inertia of the disk and its friction against the rubbing elements of said stationary brushing means will temporarily hold the disk against rotation and the rubbing elements of said rotary brushing means will therefore rotate upon and scrub the inner side of the disk, and whereby whirling of the liquid by means of said blade will then result in rotation of the disk upon the rubbing elements of said stationary brushing means, thereby scrubbing the outer side of the disk.

5. A machine for successively cleaning both sides of a conical disk of a centrifugal separator bowl, having in combination, a tank to hold a cleaning liquid, a hinged cover for the open top of said tank, stationary brushing means in said tank below the normal liquid level therein, said means including an annular series of spaced, inwardly-and-downwardly-inclined rubbing elements to contact with the outer side of an inverted separator disk to support the same beneath the liquid level in the tank, a shaft bearing in said cover axially alined with said series of elements, a rotary shaft extending through said bearing, a flat, triangular head fixed to the lower end of said shaft and extending diametrically thereof to serve as a liquid impelling blade when said cover is in a closed position, rotary rubbing elements carried by two downwardly and inwardly converging edges of said head to contact with the inner side of a separator disk supported on said stationary rubbing elements, and means for rotating said shaft.

6. The combination of claim 5 in which said rotary shaft has a limited longitudinal sliding movement in said bearing, together with spring means for urging said shaft downwardly in said bearing.

7. The combination of claim 5 together with a substantially cylindrical guard surrounding said head and fixed to and depending from the underside of said cover.

CLAUDE H. ABBOTT.

REFERENCES CITED

The following references are of record in the file of this patent:

UNITED STATES PATENTS

| Number | Name | Date |
| --- | --- | --- |
| 559,171 | Grossmann | Apr. 28, 1896 |
| 1,077,067 | Hansen | Oct. 28, 1913 |
| 1,123,995 | Denton | Jan. 5, 1915 |
| 1,317,523 | Meyer | Sept. 30, 1919 |
| 1,622,130 | Boyd | Mar. 22, 1927 |
| 1,673,972 | Dowling | June 19, 1928 |
| 2,311,066 | Meyers | Feb. 16, 1943 |
| 2,385,511 | Hays | Sept. 25, 1945 |

FOREIGN PATENTS

| Number | Country | Date |
| --- | --- | --- |
| 326,151 | Germany | Sept. 24, 1920 |
| 144,552 | Switzerland | Apr. 1, 1931 |
| 352,886 | Great Britain | July 16, 1931 |